G. F. WEYMOUTH,
Assignor to H. HOLT.
HAY KNIFE.
No. 10,072. Reissued Apr. 4, 1882.
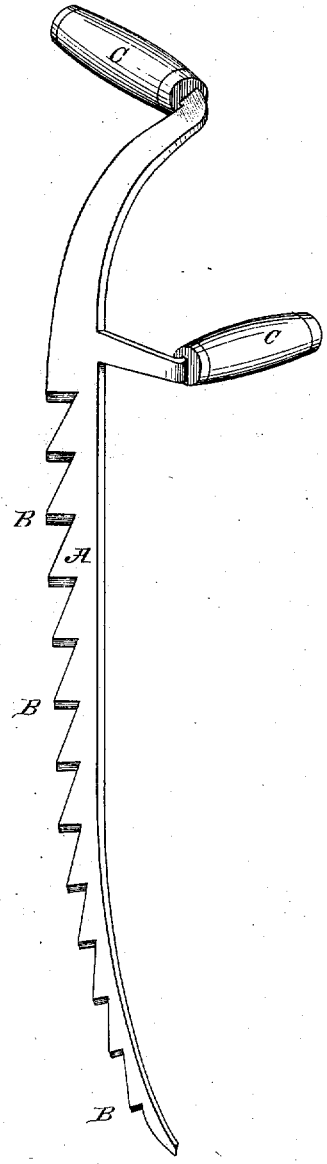
WITNESSES—
F. W. Adams
W. D. Adams
INVENTOR—
George F. Weymouth
per M. E. Dawson
Attorney
N. PETERS, Photo-Lithographer, Washington, D. C.

UNITED STATES PATENT OFFICE.

GEORGE F. WEYMOUTH, OF DRESDEN, ASSIGNOR TO HIRAM HOLT, OF FARMINGTON, MAINE.

HAY-KNIFE.

SPECIFICATION forming part of Reissued Letters Patent No. 10,072, dated April 4, 1882.

Original No. 112,400, dated March 7, 1871. Application for reissue filed November 10, 1881.

*To all whom it may concern:*

Be it known that I, GEORGE F. WEYMOUTH, of Dresden, county of Lincoln, State of Maine, have invented certain new and useful Improvements in Knives for Cutting Hay in the Mow or Stack; and I do hereby declare that the following is a full, clear, and exact description thereof, reference being had to the accompanying drawing, and to the letters of reference marked thereon, which form a part of this specification.

My invention consists in a hay-knife containing the features of construction hereinafter set forth and claimed.

In the drawing the knife is shown in perspective, with its back turned slightly toward the point of view.

A is the blade, having one of its edges outwardly curved.

B B are cutting-projections formed thereon, and sharpened on those edges nearest the blade-point.

C C are handles, by which the knife is operated.

The blade is of any suitable dimensions and terminates in a thin point. The handles C C are set off at one side of the blade in the usual manner, to save the operator from striking his hands when cutting from the side of a mow or stack.

It is intended that the knife shall be thrust endwise into the mow or stack and worked back and forward or up and down longitudinally, like a saw, cutting in its forward or downward stroke by the succeeding short knife-edges of the projections B, which are transverse to the line of their motion. To this end the cutting-edges are relatively short and are arranged, in reference to the direction of motion, to form a stepped series, retreating one behind the other from point to heel of the blade. This feature of arrangement is produced by giving the blade the curved form shown, making the cutting-edges all short and preferably not greatly unequal in length, as indicated in the drawing. The rear unsharpened edges of the projections B, being inclined at a relatively small angle from the direction of the blade-edge, facilitate the backward movement of the knife through the hay, and the cutting-edges being all short, the intervening unsharpened portions, particularly those near the point, prevent the knife from taking a too heavy cut to be readily worked.

I claim as my invention—

A hay-knife the blade whereof is provided with suitable handles and has an outwardly-curved edge provided with serrations integral with the blade and sharpened on their edges nearest the blade-point, substantially as set forth.

In testimony that I claim the foregoing as my invention I affix my signature in presence of two witnesses.

GEORGE F. WEYMOUTH.

Witnesses:

MARINDA L. HOLT,

JULIA W. HOLT.